United States Patent [19]
Manson et al.

[11] Patent Number: 5,587,642
[45] Date of Patent: Dec. 24, 1996

[54] FAN MOTOR BROWN-OUT CONTROL ALGORITHM

[75] Inventors: Larry J. Manson, Baroda; Chris A. Scriber, Holland, both of Mich.; William L. Davis, Murfreesboro, Tenn.

[73] Assignee: Whirlpool Corporation, Benton Harbor, Mich.

[21] Appl. No.: 418,621

[22] Filed: Apr. 7, 1995

[51] Int. Cl.$^6$ .................................................. H02P 7/622
[52] U.S. Cl. ...................... 318/812; 318/814; 318/822; 62/187; 62/155; 62/156; 361/156
[58] Field of Search ...................... 318/221, 700–833, 318/430–456; 323/237, 246, 239, 243, 242, 244, 300; 361/59, 75, 85, 86, 90, 30, 31, 32, 156; 340/662, 663; 62/187, 156, 155, 408, 158, 180, 208

[56] References Cited

U.S. PATENT DOCUMENTS

| | | |
|---|---|---|
| 1,961,793 | 6/1934 | Schaefer . |
| 2,068,559 | 1/1937 | Michelsen . |
| 3,539,892 | 11/1970 | Lindberg . |
| 3,784,846 | 1/1974 | Krick et al. . |
| 3,946,574 | 3/1976 | Portera . |
| 4,301,542 | 11/1981 | Weintraub et al. ...................... 455/353 |
| 4,354,214 | 10/1982 | Walton . |
| 4,443,749 | 4/1984 | Douthart et al. . |
| 4,453,117 | 6/1984 | Elms et al. . |
| 4,467,257 | 8/1984 | Douthart et al. . |
| 4,786,850 | 11/1988 | Chmiel . |
| 4,843,833 | 7/1989 | Polkinghorne ............................ 62/180 |
| 4,862,053 | 8/1989 | Jordan et al. . |
| 4,879,878 | 11/1989 | Polkinghorne ............................ 62/187 |
| 5,013,990 | 5/1991 | Weber ...................... 318/814 |
| 5,051,681 | 9/1991 | Schwarz . |
| 5,319,514 | 6/1994 | Walsh et al. ............................... 361/59 |
| 5,329,223 | 7/1994 | Riggio ...................... 323/246 |
| 5,444,359 | 8/1995 | Riggio ...................... 323/237 |

*Primary Examiner*—Paul Ip
*Attorney, Agent, or Firm*—Hill, Steadman & Simpson

[57] ABSTRACT

An air conditioner having a fan motor brown-out control algorithm for increasing the air conditioner fan speed upon sensing a brown-out under-voltage condition is provided. The air conditioner has a power supply connected to an AC line voltage, a fan motor, a multispeed fan driven by the fan motor and means for sensing a brown-out condition of the AC line voltage. The sensing means is connected to the power supply and provides a signal indicative of a brown-out condition. The air conditioner also has means for increasing the speed of the fan in response to the sensed brown-out condition signal provided by the sensing means. In an embodiment, the air conditioner further has a microprocessor and related circuitry for adjusting the speed of the fan. In another embodiment, logic circuitry is provided instead of a microprocessor. A brown-out control algorithm for an appliance having a multispeed fan and components for operating the fan is also provided. The brown-out control algorithm has the steps of providing a voltage input, sensing a brown-out condition of the voltage input by determining if a brown-out state exists for a predetermined amount of time, and configuring the electrical circuitry and components to increase the speed of the fan in response to the sensed brown-out condition.

13 Claims, 10 Drawing Sheets

| FIG. A | FIG. B |
|---|---|
| FIG. C | FIG. D |

FAN MOTOR BROWN-OUT CONTROL ALGORITHM

BACKGROUND OF THE INVENTION

The present invention relates generally to air conditioners and more specifically to a fan motor brown-out control algorithm for accommodating under-voltages supplied to an air conditioner.

The occurrence of what is known as a brown-out power condition is fairly common, especially in power distribution systems incapable of accommodating peak loads during high power demand situations. A brown-out is a power condition in which the voltage supplied by a power station is less than the standard supplied voltage. A brown-out is not as serious as a black-out in which the supplied voltage is reduced to zero. However, the under-voltage condition of a brown-out is very inconvenient because the connected electrical appliances are less effective, if even operable, at the lower brown-out voltage level.

As a result, the use of electrical appliances that are commonly prone to brown-outs becomes problematic. For example, when an air conditioner is running on medium speed and a brown-out occurs, the air conditioner effectively operates as if it is running at low speed or may have trouble operating at all. Thus, a user must continuously adjust the fan manually to a higher speed to compensate for the brown-out condition. This is time-consuming and often not even possible due to the location of the air conditioner relative to the reach of the user.

U.S. Pat. No. 4,354,214 discloses a motor control circuit, which upon detecting an under-voltage, shuts down the motor completely. Similarly, U.S. Pat. No. 3,946,574 discloses an under-voltage sensing circuit which entirely shuts down a compressor if a low-voltage condition is detected. In addition, U.S. Pat. No. 4,453,117 discloses a computerized motor control system which protects the control memory in case of a voltage brown-out condition.

Thus, the prior art solutions to a brown-out condition shut the motor off upon sensing a brown-out condition. This approach is unacceptable because it renders the motor or fan totally inoperable since it has been shut off.

As a result, a need has arisen for a fan motor brown-out control algorithm to accommodate the proper operation and use of electrical appliances in areas prone to brown-out conditions.

SUMMARY OF THE INVENTION

Accordingly, it is an object of the present invention to provide a fan motor brown-out control algorithm and associated electric circuitry to accommodate proper operation and use of electrical appliances in the event of brown-out conditions.

To this end, an embodiment of the present invention provides an air conditioner, having a power supply connected to an AC line voltage, a fan motor, and a multispeed fan driven by the fan motor. The air conditioner also has means for sensing a brown-out condition of the AC line voltage and for providing a signal indicative of the brown-out condition. The sensing means is connected to the power supply. The present invention also has means for increasing the speed of the fan in response to the sensed brown-out condition signal provided by the sensing means.

These and other features of the presently preferred embodiments will become clearer below with reference to the following detailed description of the presently preferred embodiments and with reference to the accompanying drawings.

DETAILED DESCRIPTION OF THE PREFERRED EMBODIMENTS

Figure 1:
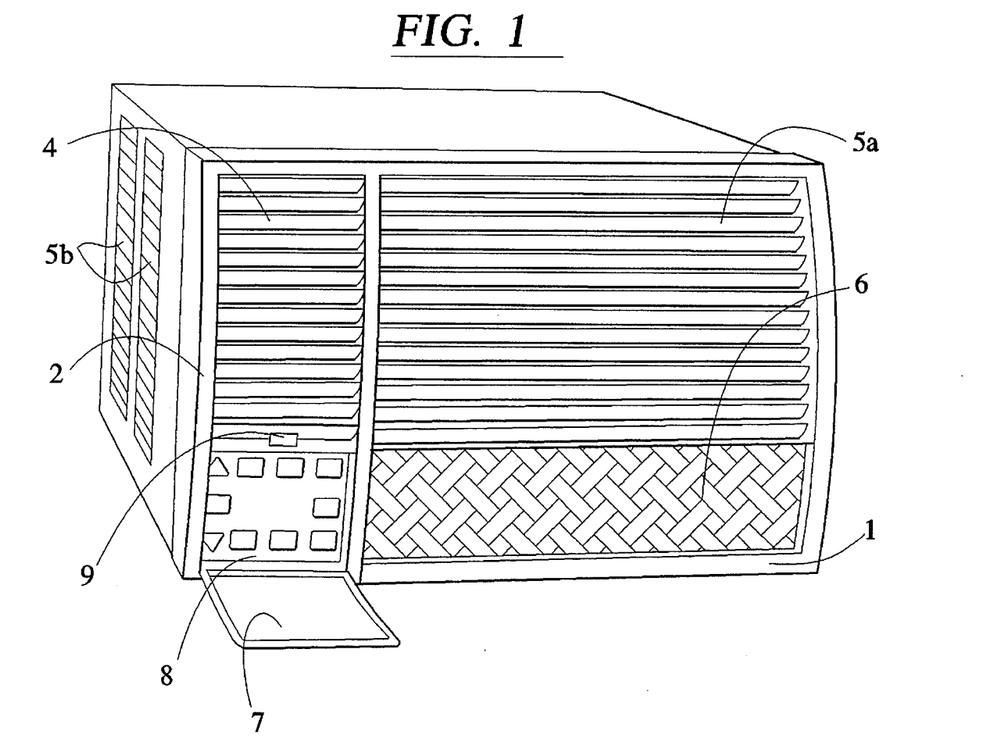
FIG. 1 illustrates, in perspective view, a window-mounted type air conditioner in which the presently preferred algorithm embodiment can be incorporated.
Figure 2:
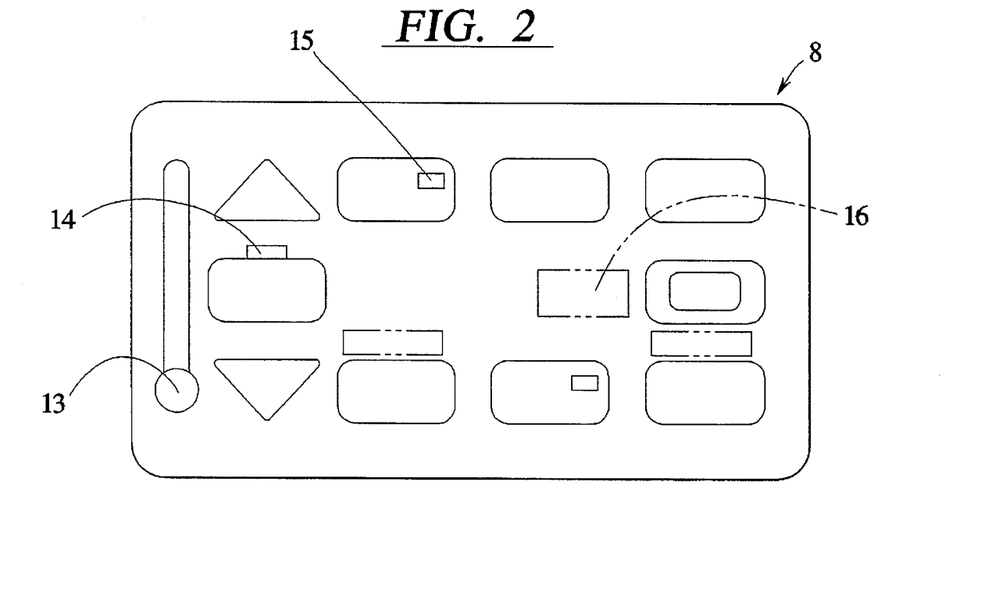
FIG. 2 illustrates a control panel key pad for a control system of the present invention.

FIG. 1 illustrates, in perspective view, an air conditioner in which the present invention can be used. FIG. 1 illustrates an air conditioner 1 made or to be made by or for Whirlpool Corporation. Such an air conditioner 1 includes a front face 2 having air output louvers 4 and inside air intake louvers 5a and a decorative panel 6. The air conditioner 1 also has outside air intake louvers 5b, through which outside air is drawn into the air conditioner 1. The decorative panel 6 includes a control panel door 7, which when opened, exposes a control keypad panel 8 which is illustrated in FIG. 2 and further described below. Also, an infrared sensor 9 is located just above the control panel door 7.

With reference to FIG. 2, the control panel 8 for the air conditioner 1 will now be described. As illustrated, the control panel 8 for the air conditioner 1 includes the following features:

(a) A temperature set point indicating gauge 13 by which means of which a user can be visually signalled as to whether the temperature set point is being increased or decreased by the user. As will be described more fully below, preferably this temperature gauge 13 simulates a liquid base thermometer in appearance complete with bulb and stem and the visual indications are provided by discrete light emitting diodes vertically positioned along what would be the length of the stem so as to visually indicate an increase or decrease in temperature set point.

(b) A "WARMER" button by means of which a user can manually incrementally increase, preferably in 1° C. increments, a temperature set point by depressing the button.

(c) A "COOLER" button by means of which a user can manually incrementally decrease, preferably in 1° C. increments, a temperature set point by depressing the button.

(d) An "AUTO COOL/ON" button by means of which a user can either turn the air conditioner 1 on, or if the air conditioner is already on, to select an "AUTO COOL" cycle of operation, more fully described below.

(e) A visual indicator 14, preferably in the form of a light emitting diode, is provided to indicate whether the air conditioner 1 is in an AUTO COOL cycle of operation.

(f) A "DRY ONLY" button by means of which a user can select a dehumidifying cycle of operation in which the air conditioner removes excess moisture from room air without providing much cooling. The "DRY ONLY" cycle is activated by depressing the "DRY ONLY" button and at that time a visual indicator 15 positioned within the button, preferably a light emitting diode, will be illuminated.

(g) A "FAN SPEED" button by means of which a user can modify the operating speed of the air conditioner fans. As will be described further below, each press of the "FAN SPEED" button advances the fan speed through a selection cycle from "high speed" to "medium speed" to "low speed" and then back to "high speed".

(h) A "SLEEP HOURS" button by means of which a user can select a "SLEEP HOURS" cycle of operation described more fully below which allows the air conditioner 1 to optimize comfort while the user is sleeping. The "SLEEP HOURS" button is pressed until a number for the desired time period for the "SLEEP HOURS" cycle is lit. Numerals preferably backlit by light emitting diodes, indicate selectable three hours, five hours or eight hours of operation.

(i) A "TIMED OFF HOURS" button which allows a user to select a "TIMED OFF HOURS" cycle of operation whereby the air conditioner is programmed to turn itself off after a set period of time. Once the cycle is activated, the unit continues in the current operating cycle until the "TIMED OFF HOURS" cycle is complete. Numerals preferably backlit by light emitting diodes, are provided for selection of timed out periods of one, three and five hours. This cycle of operation is selected by pressing of the "TIMED OFF HOURS" button until a number for the desired time period is lit.

(j) A "CHECK FILTER" visual indicator 16, preferably the words "CHECK FILTER" backlit by light emitting diodes, that comes on approximately every 100 hours of operation to alert a user to check an air filter in the air conditioner 1 to see if it needs cleaning.

(k) An "OFF" button by means of which the air conditioner would be turned off and further by means of which the check filter visual indicator 16 can be deactivated. To deactivate the check filter visual indicator 16, the air conditioner control system can be programmed to accept repetitive depressions of the "OFF" button as an indication to deactivate the check filter visual indicator 16.

Figures 3, 5B:
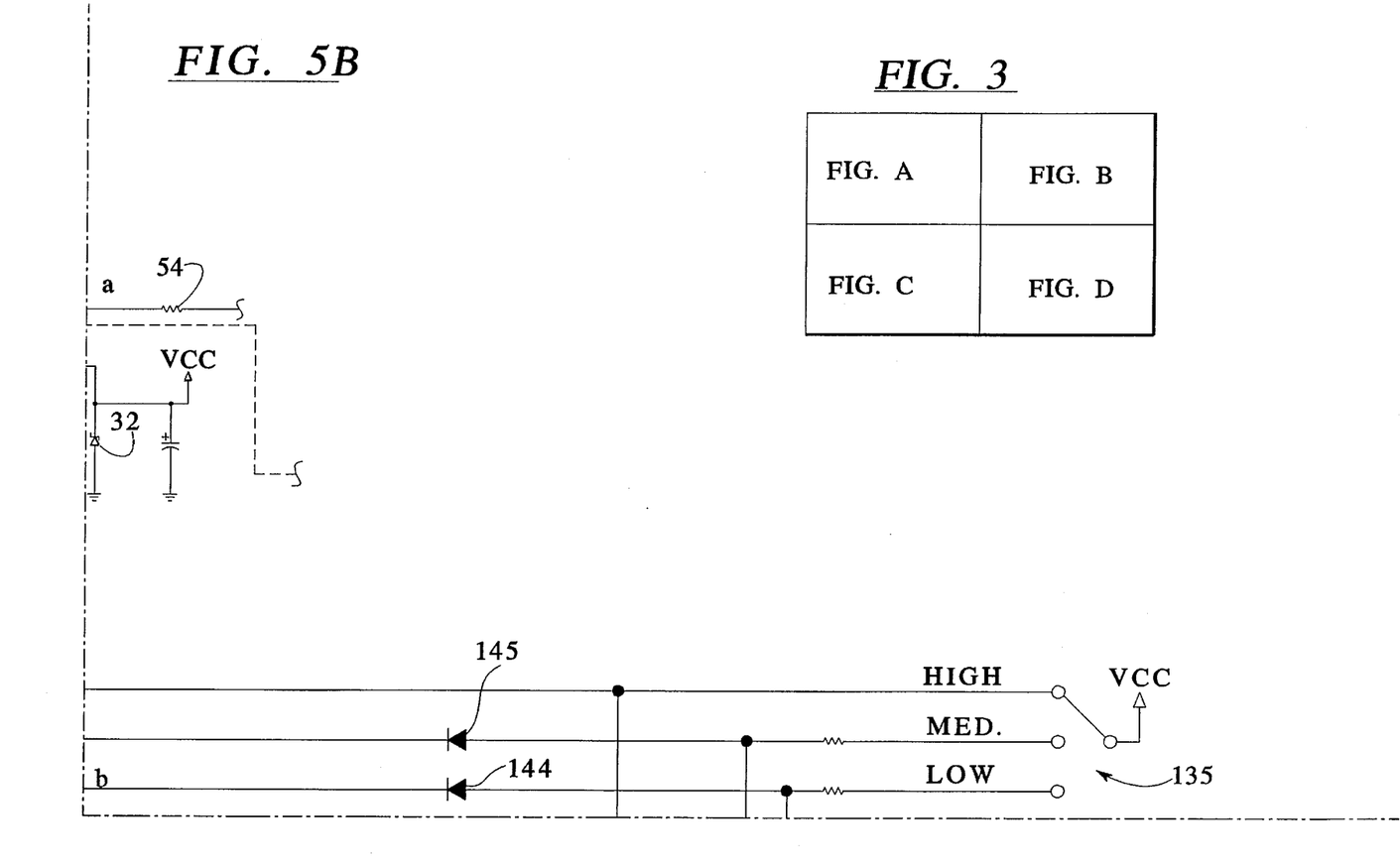
FIG. 3 illustrates the interconnections and inter-relationships between various portions of the schematics illustrated in FIGS. 4A–4D and FIGS. 5A–5D.
FIGS. 5A–5D illustrate an electrical schematic of another embodiment of the present invention.
Figure 4A:
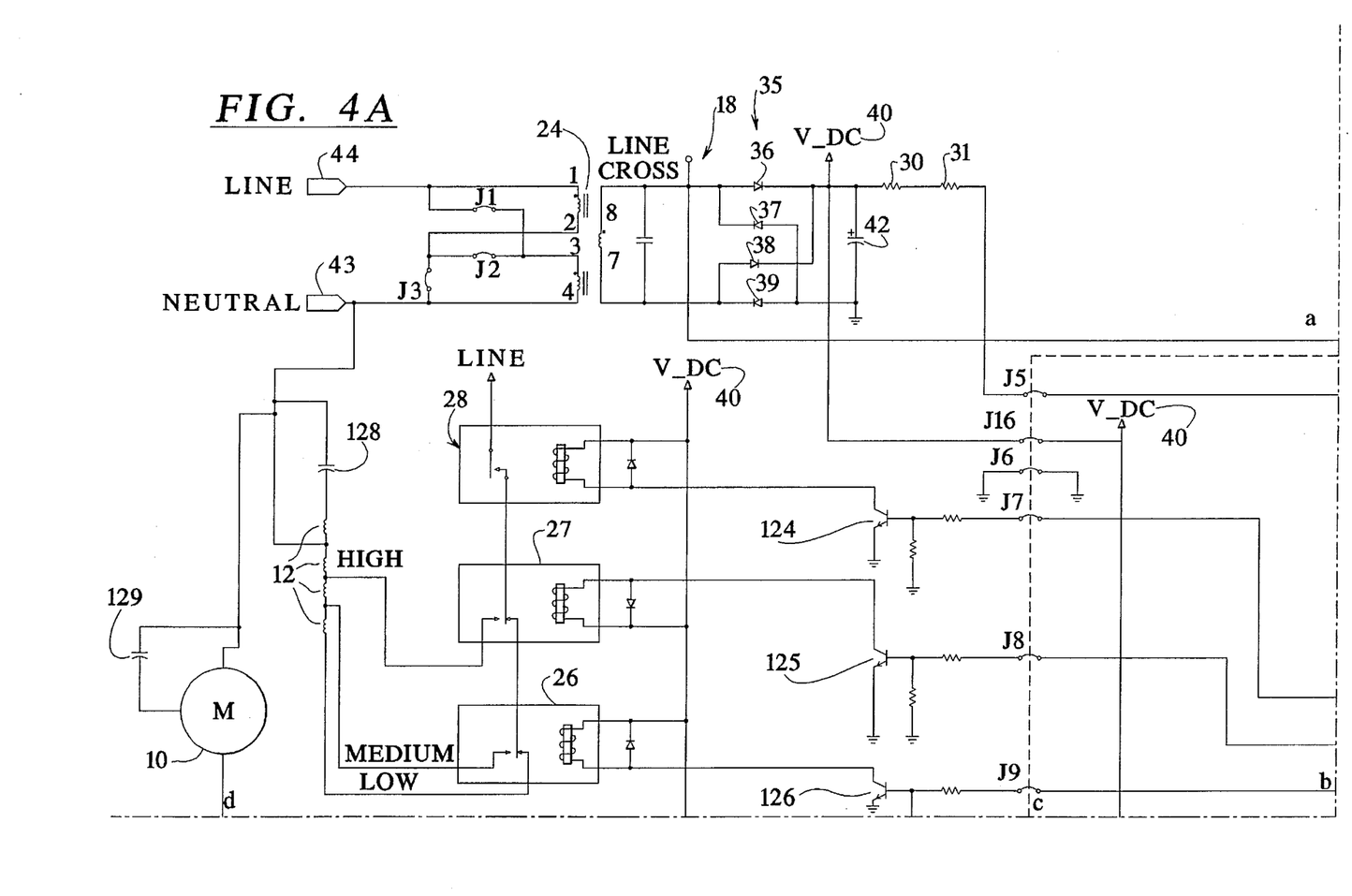
FIGS. 4A–4D illustrate an electrical schematic of an embodiment of the present invention.
Figure 4B:
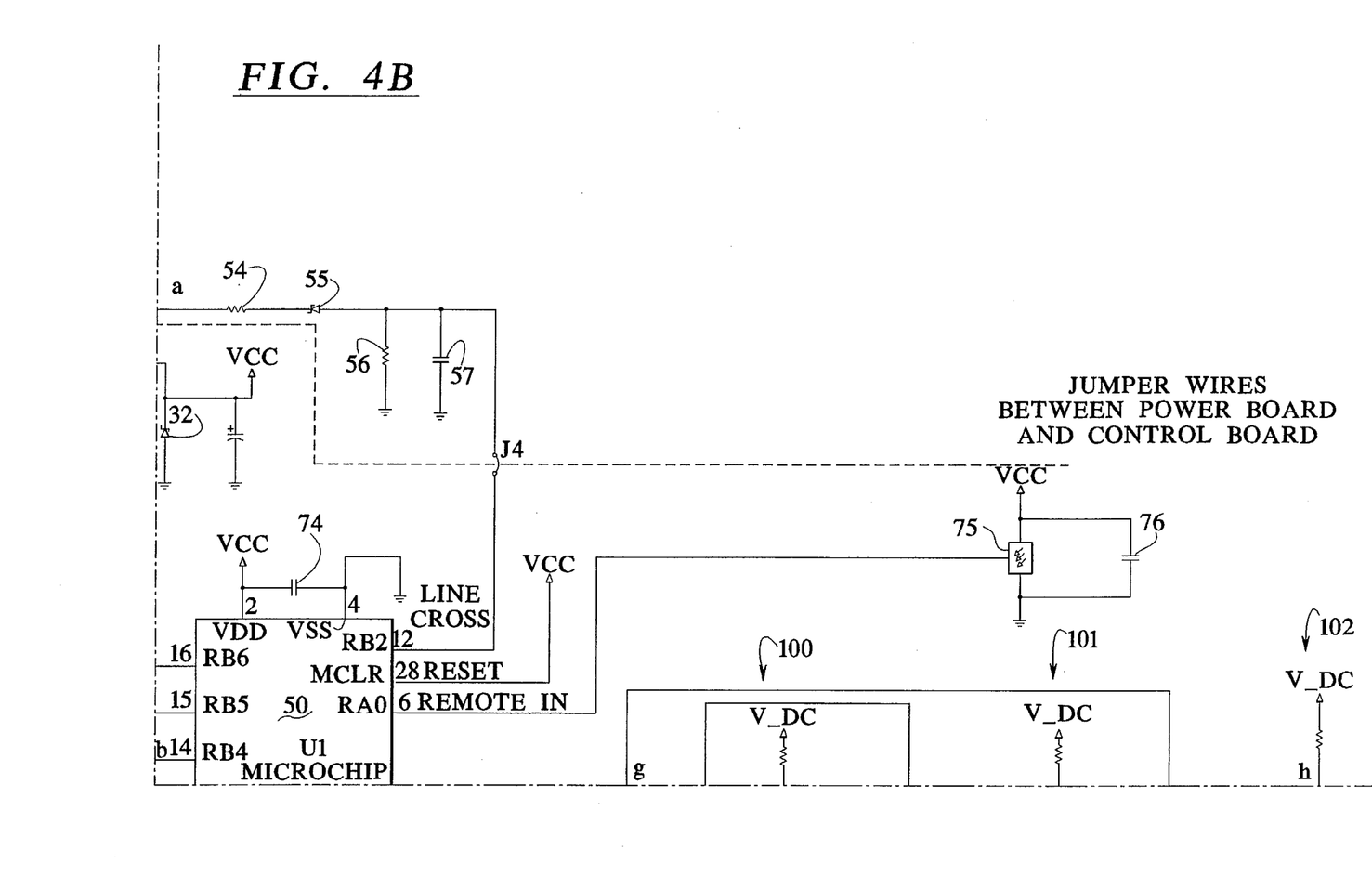
Figure 4C:
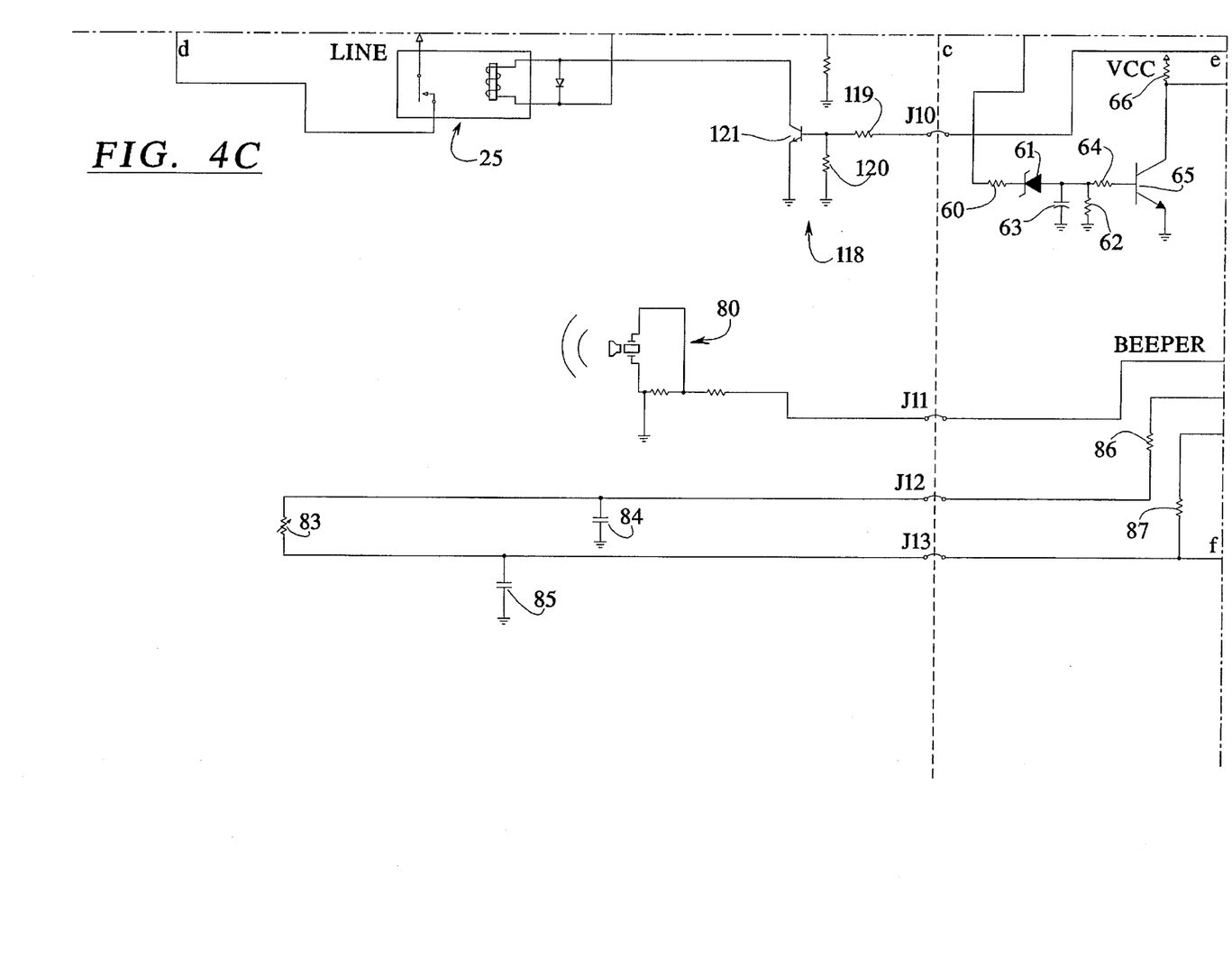
Figure 4D:
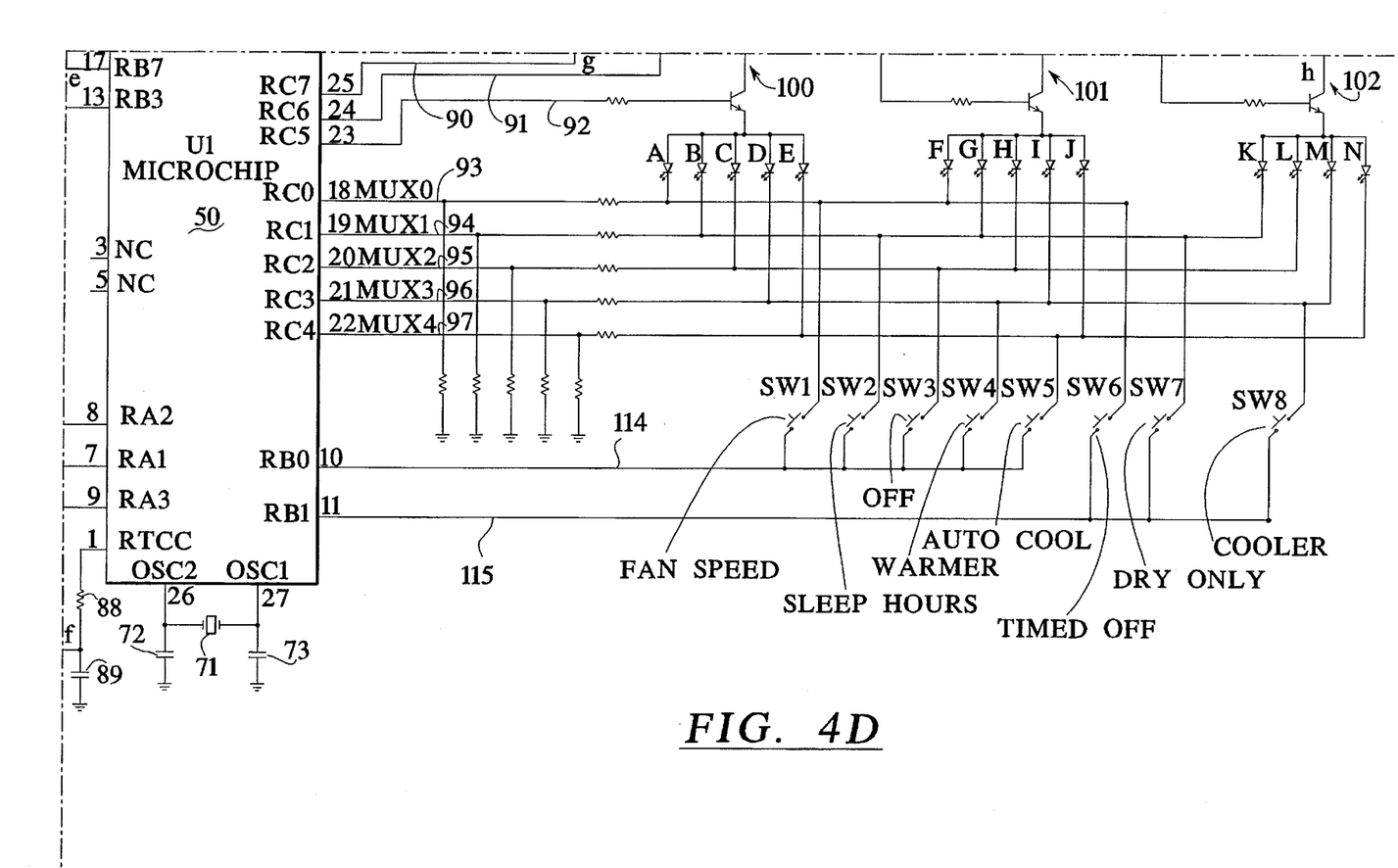
Figure 5A:
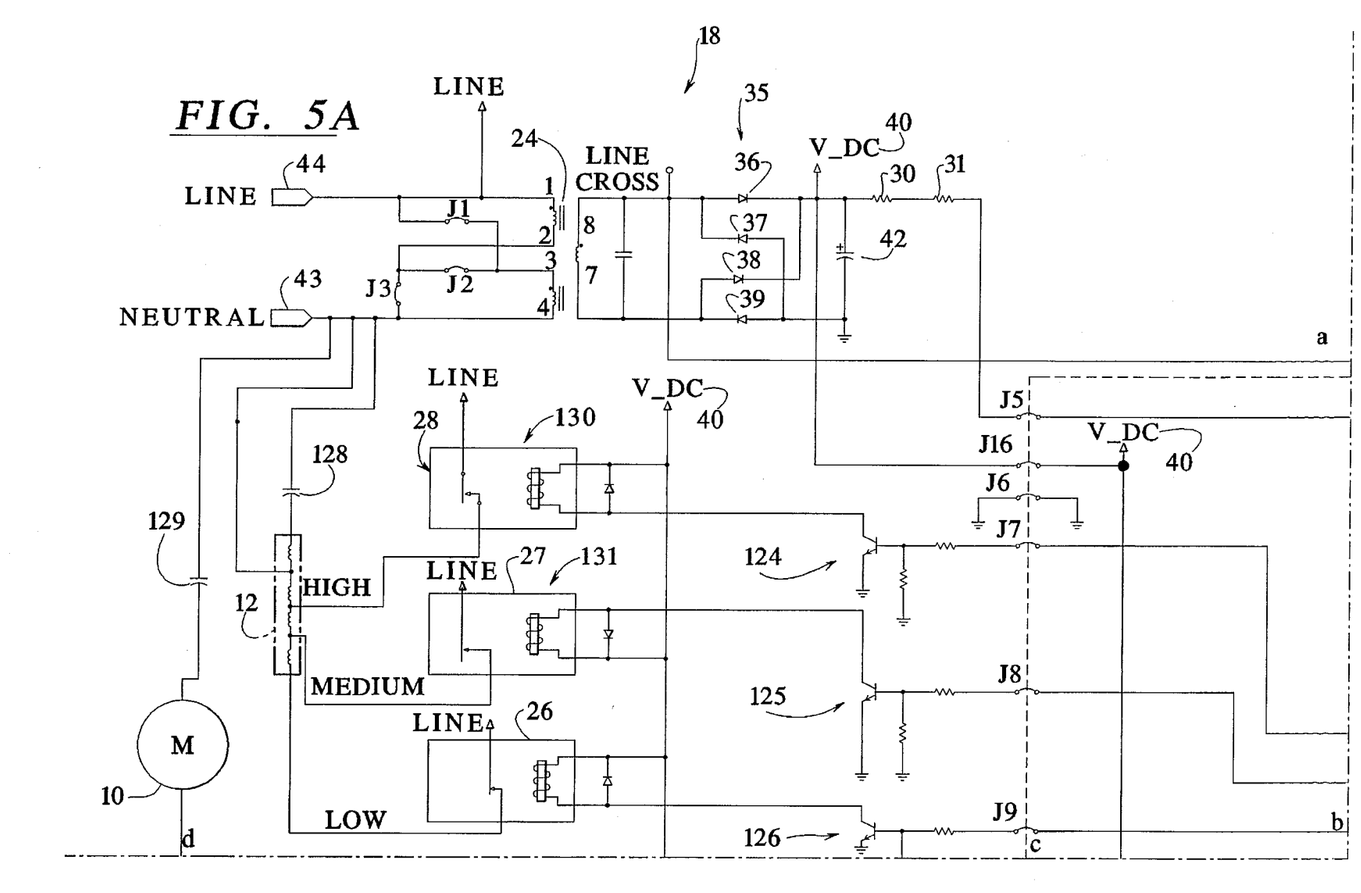
Figure 5C:
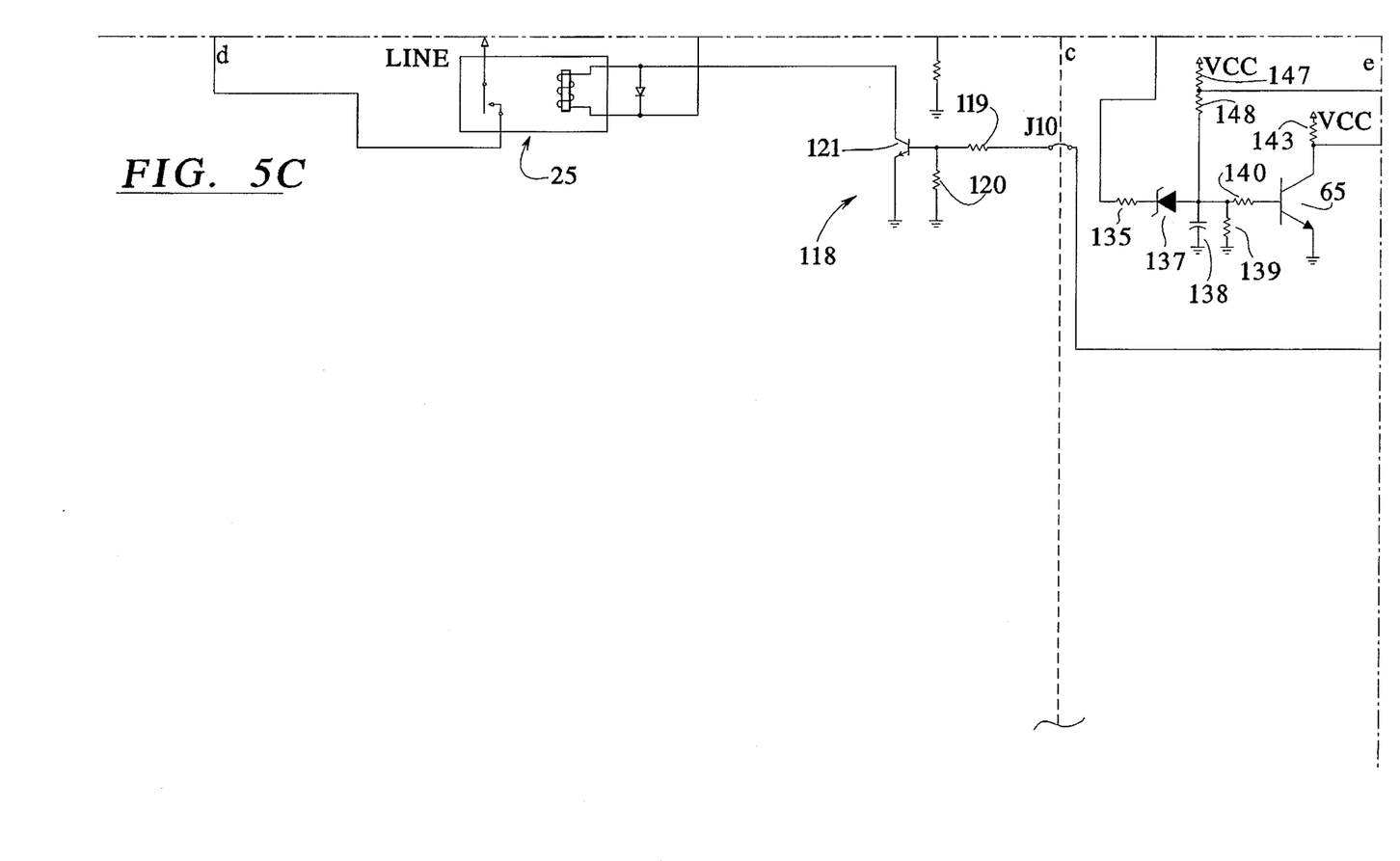
Figure 5D:
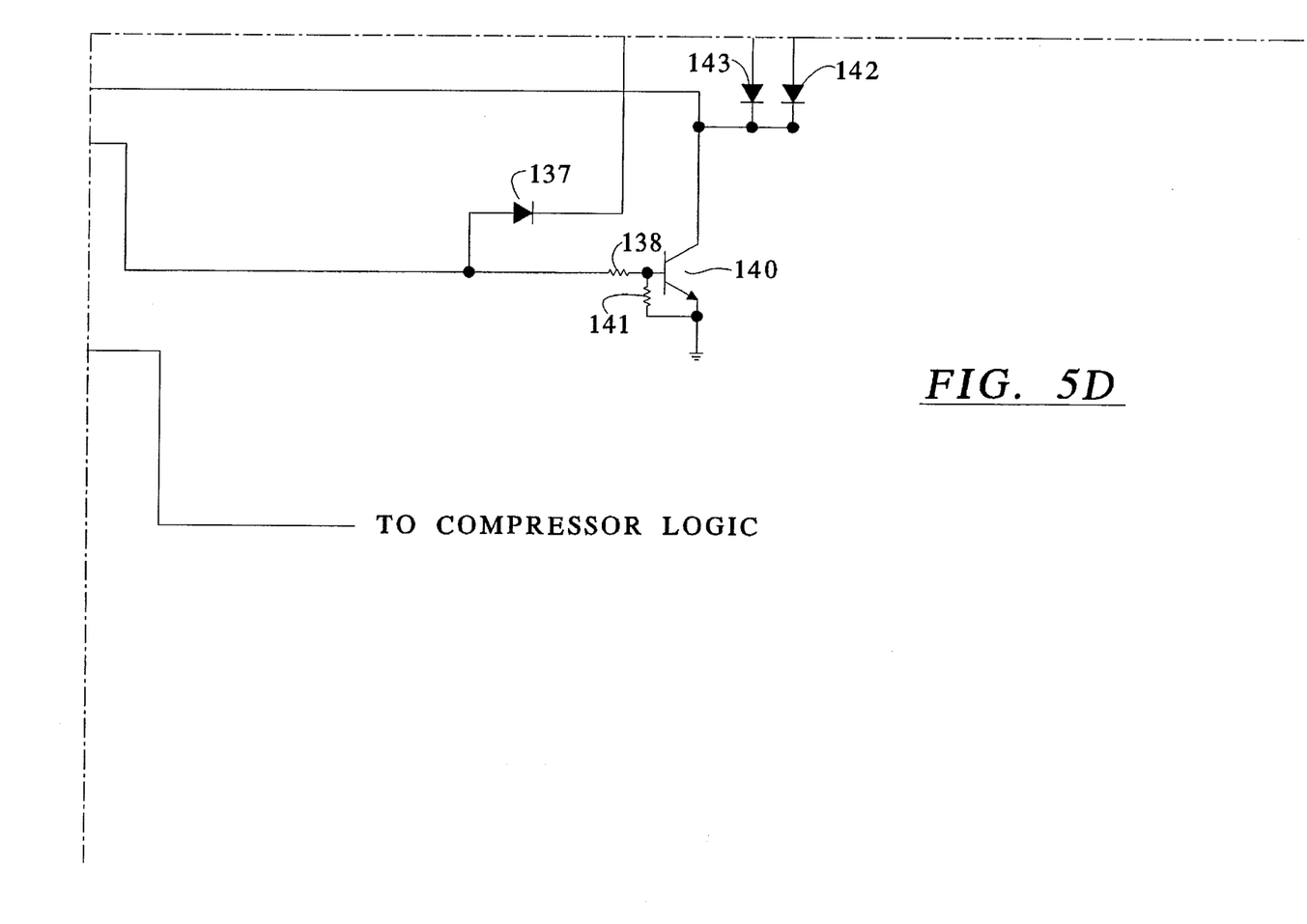

FIGS. 4A–4D illustrate an electrical schematic diagram of the fan motor brown-out control algorithm circuitry of the present invention. FIG. 3 illustrates the relative orientations of FIGS. 4A–4D and FIGS. 5A–5D. As illustrated, the air conditioner 1 has a compressor 10 and a fan motor 12 with more than one speed.

The circuitry of the preferred embodiment consists of a power supply 23 having jumpers J1–J13 that enable adaptation of the control to different electrical supply voltages. The power supply 23 also contains a transformer 24 for the reduction of the line voltage to a more suitable voltage for the control of relays 25, 26, 27, 28. Further reduction of voltage by impedance elements 30 and 31 is provided, and the control of said voltage by a zener diode 32 is used to have a suitable voltage for various semiconductor elements.

The power supply is connected to a suitable AC line voltage by means of terminals 44 and 43. In that regard, the power supply 23 is configured to convert either 115 V or 220/240 V AC input power at 50 or 60 Hz to the DC voltages suitable for the electronic controller. For that purpose, should the input power comprise 115 V AC, the illustrated jumpers J1 and J3 are kept in place while the jumper J2 is disconnected, but should the input power comprise 220/240 V AC, jumpers J1 and J3 are removed or disconnected, and the jumper J2 is connected.

The transformer 24 supplies power to a full wave diode bridge 35 consisting of diodes 36, 37, 38 and 39 which rectify the voltage to provide a direct current voltage source 40. Across the secondary of the transformer 24 is a filter capacitor 42 to reduce electrical noise that may have been passed from the electrical mains (neutral 43 and line 44) via the transformer 24. An unrectified sample of the line voltage LINE CROSS reduced by the transformer 24 is observed by the microcomputer 50 (at port RB2, pin 12) after signal conditioning by resistor 54, zener diode 55, resistor 56, and capacitor 57. This signal conditioning further reduces and controls the sinusoidal output of the transformer 24 to provide a square wave input to the microcomputer 50 with voltage excursions that the microcomputer 50 can interpret. The microcomputer 50 can then determine if there is a loss of voltage on the electrical mains 43, 44 and provide a mechanism to allow software of the microcomputer 50 to determine the frequency of the ac line. The microcomputer 50 can provide a real time clock based on the incoming line frequency and also an input that can be used to synchronize events such as the closure of relays with the ac line to maximize relay life.

The output of the full wave diode bridge 35 provides, in conjunction with filter capacitor 42, the unregulated dc voltage 40 that is supplied to the relays 25, 26, 27, 28, the voltage-reducing impedances 30, 31 and the circuitry to detect a brown-out condition. A sample of the unregulated direct current supply 40 is reduced by resistor 60, zener diode 61, and resistor 62. Capacitor 63 provides further filtering to reduce the ac component. The voltage across resistor 62 and capacitor 63 produces a current through resistor 64 and the base emitter junction of NPN transistor 65 when a brown-out is not present. This current through the base emitter junction will saturate transistor 65 when a brown-out is not present, drawing the voltage on the emitter to a voltage that the microcomputer 50 will interpret by hardware means as a logic "0" on port RB3. Resistor 66 supplies a voltage to port RB3, pin 13 of microcomputer 50 that will be interpreted as a logic "1" by hardware means when transistor 65 is in a state normally regarded as "off" due to a lack of conduction through the collector-emitter junction. This lack of conduction is caused by a lack of a current flowing through the base-emitter junction due to a voltage less than that necessary to turn on transistor 65. This is a result of the unregulated dc voltage 40 being insufficient to cause zener diode 61 to breakdown or conduct. This insufficient voltage is caused by the voltage of the mains 43, 44 being less than the preferred voltage for normal operation of the product. This condition is called a brown-out condition.

The present method of detecting a brown-out is preferred due to its minimal cost addition to the product. However, there are minor shortcomings that must be accepted due to this implementation. For example, when the voltage on the mains 43, 44 drops from the nominal operating voltage to a brown-out condition, the voltage across resistor 62 drops from about 9 volts to 0.5 volts when the power supply 18 is lightly loaded. For instance, when a number of relays are energized and the power supply 18 is heavily loaded, the voltage across resistor 62 will drop from about 7 volts to about 0.4 volts. This situation represents an undesirable, but acceptable, shift of the brown-out voltage.

A second minor shortcoming that is partially compensated for by timing is a lack of hysterisis in the brown-out detection. These minor shortcomings are not considered sufficient to raise the cost of the product to overcome them. More costly embodiments could use a second and/or third input set at a different trip voltage which would permit hysterisis control and/or compensation for microcomputer load. Alternately, it would be possible to use a more expensive microcomputer 50 with an analog-to-digital converter to directly sample the voltage across resistor 62 to enable an algorithm to perform computations on a digital value containing a more complete representation of the voltage on the mains.

An additional alternate method would be to use a signal from the microcomputer, possibly even from the outputs to various relays, to bias a summing junction, where the voltage indicating a brown-out would be summed or compensated for loads that were present and/or a hysterisis would be provided. These methods are not preferred due to the higher cost and the reduced reliability associated with them due to their higher complexity.

The microcomputer 50 also has a ceramic resonator circuit 70 consisting of a 4 megahertz ceramic resonator 71 and capacitors 72, 73 which provide a clock frequency to cause the microcomputer 50 to implement instructions from the read only memory contained within it. A filter capacitor 74 is closely connected across the connection to provide power to microcomputer 50 and to reduce electrical noise that could cause incorrect operation of the microcomputer 50.

An infrared receiver 75 and a filter capacitor 76 are also connected to the microcomputer 50. The infrared receiver 75 receives a light beam from a remote control transmitter (not shown). By using an internal photo diode and a demodulator circuit, the infrared receiver 75 converts the light beam to a series of pulses from which the microcomputer 50 can interpret commands.

The remote control circuit 75, 76 provides for wireless communication with a remote control unit of the air conditioner 1, preferably via the infrared sensor 9. Accordingly, the remote control unit preferably operates much like any of the currently available remote TV controls. The remote control unit substantially mimics the control panel 8 of the air conditioner 1.

In addition, a piezoelectric resonator 80 with appropriate circuitry is attached to the microcomputer 50 to allow the microcomputer 50 to produce audible feedback to various input stimuli via the resonator 80.

A temperature reading circuit 82 consisting of an NTC thermistor 83 with filter capacitors 84, 85 and discharge resistor 86, 87 and reference charging resistor 88 and capacitor 89 forms an inexpensive, but relatively accurate temperature input for the microcomputer 50. The thermistor 83 is provided for measuring air temperature adjacent the air conditioner 1 so that when the air conditioner 1 is operated, for example, in an automatic cycle of operation, the air conditioner 1 can be driven to achieve a temperature substantially equal to a temperature set point selected by a user using the control panel 8.

The microcomputer 50 compares a time for the capacitor 89 to charge the thermistor 83 and resistor 88, from which a comparison temperature can be computed. The microcomputer 50 has three strobe lines 90, 91, 92 and five multiplex lines 93, 94, 95, 96, 97 by which the microcomputer 50 can use one of three circuits 100, 101 or 102 to light LEDs A–N for a very short period of time in such a way that the eye perceives the lights as being on constantly. This is done to provide visual feedback to the user of cycles selected and various conditions. The strobe and multiplex lines 90–97 also enable various switches SW1–SW8 which the microcomputer 50 can read, by input lines 114 and 115, to determine when a user is requesting a change in cycles or operating conditions. The load control circuit 118 can be controlled by the microcomputer 50 through resistor 119 and biasing resistor 120 to energize transistor 121 to turn on the compressor relay 25, which will cause power to be applied to the compressor 10.

Similarly load control circuits 124, 125 and 126 energize relays 28, 27 and 26, respectively to control the windings of the fan motor 12. Relay 28 is wired as a master relay for the fan and has greater internal spacings to meet code and life requirements for switching the load and the applied voltages. Relay 28 must be energized when the fan is to run. Relays 27 and 28 are then used to energize the high, medium, or low windings of fan motor 12. If the microcomputer 50 detects that a brown-out condition has occurred, then relay 27 would be energized to apply power to the high speed winding of the motor 12. Capacitor 128 provides phase shifting for the motor 12, which is common for a permanent split capacitor motor. Capacitor 129 provides a similar function for the compressor 10.

As further illustrated, the microcomputer 50 is coupled by means of outputs RB6, RB5, RB4 and RB7 to various relays K1, K2, K3 and K4 to operate a variable speed fan motor 12 at various speeds ranging from "high" to "medium" to "low." Similarly, a user may modify the fan speed while the air conditioner 1 is in the AUTO COOL cycle of operation by pressing the FAN SPEED button described above. As described above, each press of the FAN SPEED button advances the fan speed through the cycle high to medium to low and then back to high so that a user presses the FAN SPEED button to a desired fan speed is reached.

Additionally, also coupled to the microcomputer 50 are the various switches associated with the buttons on the control panel 8, namely a FAN SPEED switch SW1, a SLEEP HOURS switch SW2, an OFF switch SW3, a WARMER switch SW4, an AUTO COOL switch SW5, a TIMED OFF switch SW6, a DRY ONLY switch SW7, and a COOLER switch SW8. The various light emitting diodes associated with the various indicators described above are also illustrated, particularly, in FIG. 4D. Diode A is provided for indicating the three-hour SLEEP HOURS cycle, a diode B is provided for indicating the five-hour SLEEP HOURS cycle, a diode C is provided for indicating the eight-hour SLEEP HOURS cycle, a diode D for indicating that the AUTO CYCLE mode has been selected and a diode E is provided for indicating that the DRY CYCLE has been selected. Light emitting diodes F–J are provided for indicating an increase or decrease in the temperature set point in connection with the indicator 13, as described above. Further, a diode K is provided for indicating that the TIMED OFF cycle of one hour is selected, a diode L is provided for indicating that the TIMED OFF cycle of three hours is selected and a diode M is provided for indicating that the TIMED OFF cycle of five hours has been selected. Diode N is provided for generating the CHECK FILTER indication.

An alternative of implementing a brown-out circuit of the present invention is to use logic other than that provided by the microcomputer 50 in the embodiment of FIGS. 4A–4D. In the alternative embodiment shown in FIGS. 5A–5D (wherein like numerals represent like parts), three relays 130, 131 and 132 are used to individually select a single winding of the fan motor 12. A three position switch 135 is set by the consumer to the speed desired under normal line voltage conditions. When a brown-out occurs, transistor 65 is non-conducting and its emitter is positive. The current flows through resistor 66 and diode 137 to energize transistor circuit 124, energizing relay 130 and to select the high speed fan winding. Resistor 138 allows a path for current flow to energize the base of a transistor 140 and its biasing resistor 141. The emitter of transistor 140 is at dc ground potential when a brown-out is in effect. Therefore, current will flow through steering diodes 142 and 143, disabling the signal to the transistor circuits 125, 126 and energizing the relays to energize the low and high speeds of the fan motor 12. Diodes 144 and 145 provide the voltage required to cause current to flow through the base of transistor circuits 125 and 126 to insure that transistor 140 in conjunction with diodes 142 and 143 can force a turn off of the relays 131 and 132. Additionally, the emitter of transistor 140 provides a feedback through resistor network 147 and 148 to provide hysterisis for the brown-out circuit to prevent an oscillation between different fan motor windings. In some motors there may be no advantage to disabling the low or medium speed fan windings which would allow for an embodiment having further simplification.

Figure 6:
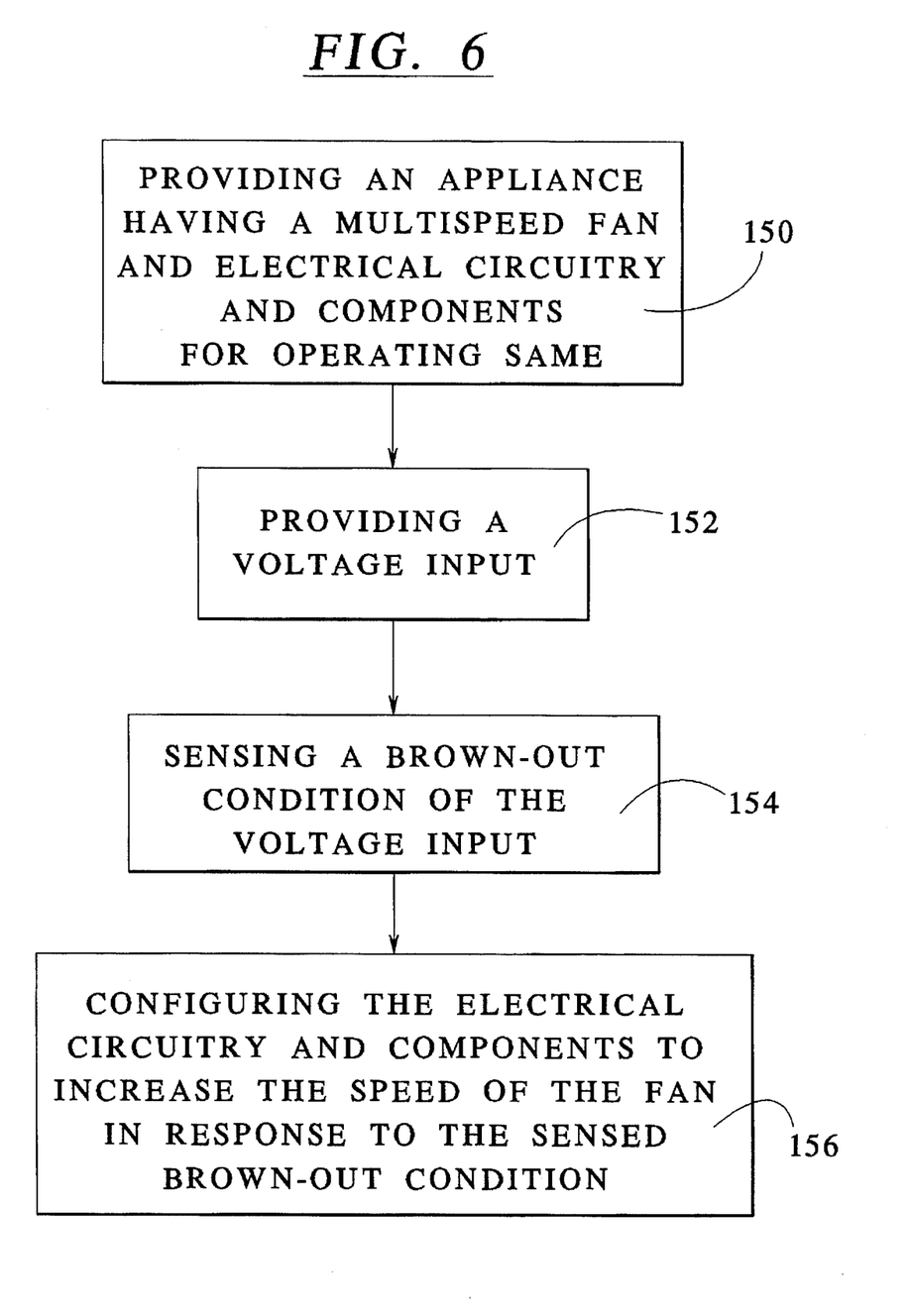
FIG. 6 represents a flowchart of the operation of an embodiment of the present invention.

FIG. 6 is a flowchart representing the basic operation of an embodiment of the present invention. The fan motor brown-out control algorithm of the present invention provides a method for an appliance having a multispeed fan and electrical circuitry and components for operating the fan to compensate for a brown-out condition, for example, as experienced during an under-voltage of the AC line voltage. The brown-out control algorithm method has the steps, beginning at step 150, of providing an appliance having a multispeed fan and electrical circuitry and components for operating the fan; providing an input voltage at step 152; sensing a brown-out condition of the input voltage by determining if a brown-out state exits for a pre-determined amount of time at step 154; and configuring the electrical circuitry and operating components to increase the speed of the fan in response to the sensed brown-out condition in step 156. Thus, the brown-out control algorithm method for the present invention is applicable to either illustrated embodiment. The embodiment illustrated in FIGS. 4A–4D uses a microprocessor, whereas the embodiment illustrated in FIGS. 5A–5D utilizes logic circuitry without a microprocessor.

As is apparent from the foregoing specification, the invention is susceptible of embodiments with various alterations and modifications which may differ particularly from those that have been described in the proceeding specification.

It should be understood that we wish to embody within the scope of the patent warranted hereon, all such modifications as reasonably and properly within the scope of our contribution to the art.

The embodiments of the invention in which an exclusive property or privilege is claimed are therefore defined as follows:

1. An air conditioner, comprising:

a power supply connected to an AC line voltage;

a fan motor;

a multispeed fan driven by the fan motor, the multispeed fan having at least a first speed, a second speed and a third speed of discrete increasing values;

means for selecting one of the first, second or third speeds of the fan to obtain a selected speed of the fan;

means for sensing a brown-out condition of the AC line voltage and for providing a signal indicative of the brown-out condition, the sensing means being connected to the power supply; and means for increasing the speed of the fan from the selected speed to the next higher speed Value in response to the sensed brown-out condition signal provided by the sensing means.

2. The air conditioner of claim 1, wherein the means for sensing a brown-out condition of the AC line voltage further comprises:

electrical circuit means.

3. The air conditioner of claim 1, wherein the power supply connected to an AC line voltage further comprises:

a plurality of jumpers to configure the power supply to accept either 115 V or 220/240 V AC input line voltage at 50 or 60 Hz and to convert the AC line voltage to DC voltages suitable for the air conditioner.

4. The air conditioner of claim 1, wherein the means for increasing the speed of the fan in response to the sensed brown-out condition signal provided by the sensing means further comprises:

a microprocessor; and circuit means for adjusting the speed of the fan from the selected speed to the next higher speed, the circuit means being responsive to a sensed brown-out condition.

5. The air conditioner of claim 4, wherein the circuit means further comprises:

a plurality of relays connected to windings corresponding to the discrete speeds of the fan on the fan motor and arranged to increase the speed of the fan motor in discrete amounts.

6. The air conditioner of claim 4, wherein the microprocessor further comprises:

a real time clock based on the incoming AC line voltage frequency; and means for synchronizing relay closures with the AC line voltage to maximize relay life.

7. The air conditioner of claim 1, wherein the means for sensing a brown-out condition of the AC line voltage further comprises:

a microprocessor;

means for generating a DC voltage from the AC line voltage;

a transistor having a base connected to the means for generating a DC voltage from the AC line voltage via a plurality of electrical circuit components including a diode, the transistor having a collector connected, via a resistor, to the microprocessor to provide a voltage input signal to the microprocessor, such that the resistor provides the voltage input signal to the microprocessor; and signal conditioning circuitry connected to the means for generating a DC voltage from the AC line voltage to provide an input to the microprocessor so that the microprocessor can thereby determine a brown-out condition of the AC line voltage.

8. The air conditioner of claim 7, wherein the voltage input signal to the microprocessor from the resistor is a logical "0" when the transistor is conducting, thereby indicating no brown-out condition, and a logical "1" when the transistor is off due to the DC voltage connected to the base of the transistor via the diode being insufficient to cause the diode to conduct, thereby indicating a brown-out condition.

9. A brown-out control algorithm for an appliance having a multispeed fan with a plurality of speeds having discrete values and electrical circuitry and components for operating same, said algorithm comprising the steps of:

provisioning a voltage input;

sensing a brown-out condition of the input voltage by determining if a brown-out state exists for a predetermined amount of time; and configuring the electrical circuitry and components to increase the discrete value of the speed of the fan from one of the plurality of speeds to another speed having a higher discrete value in response to the sensed brown-out condition.

10. A brown-out control apparatus for adjusting the speed of a multispeed fan having a plurality of speeds having discrete values in an appliance, said apparatus comprising:

a power supply connected to an input power source;

means for sensing a brown-out condition of the input power source and providing an output; and means for adjusting the speed of the fan from one of the plurality of speeds to another speed having a higher discrete value depending on the output of the sensing means.

11. The brown-out control apparatus of claim 10, wherein the means for adjusting the speed of the fan further comprises:

a plurality of relays individually connected to a single winding of the multispeed fan; and logic circuitry connected to the plurality of relays.

12. The brown-out control apparatus of claim 11, wherein the means for adjusting the speed of the fan further comprises:

electrical circuit means for energizing the relays.

13. The brown-out control apparatus of claim 10, wherein the power supply connected to an input power source further comprises:

a plurality of jumpers to configure the power supply to accept either 115 V or 220/240 V AC input line voltage at 50 or 60 Hz and to convert the AC line voltage to DC voltages suitable for the appliance.

* * * * *